Aug. 18, 1953

R. R. BEEZLEY 2,649,316

GREASE SEAL SPACER

Filed June 16, 1948

INVENTOR.
REGINALD R. BEEZLEY

Aug. 18, 1953
R. R. BEEZLEY
2,649,316
GREASE SEAL SPACER
Filed June 16, 1948
2 Sheets-Sheet 2
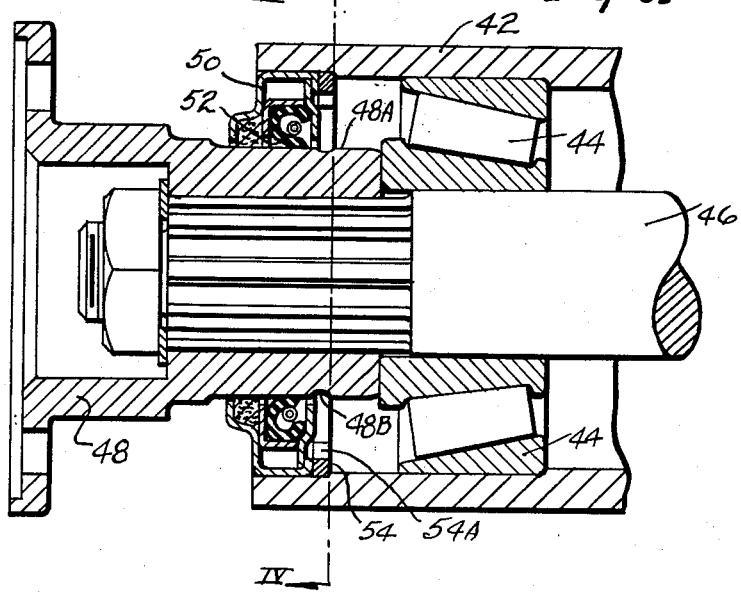
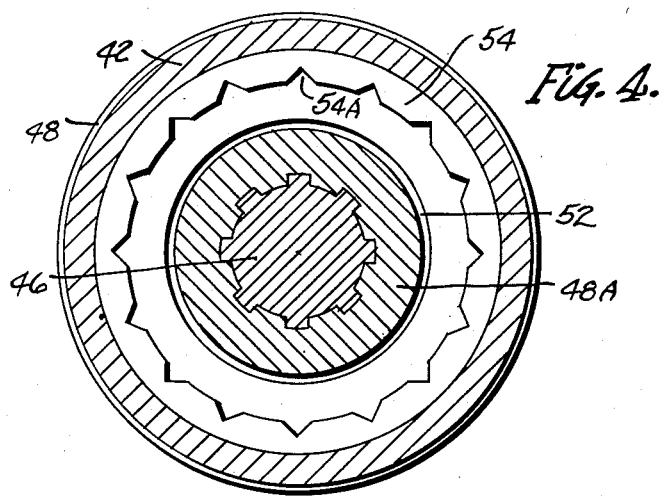
INVENTOR.
REGINALD R. BEEZLEY Patented Aug. 18, 1953

2,649,316

UNITED STATES PATENT OFFICE 2,649,316

GREASE SEAL SPACER

Reginald R. Beezley, Memphis, Tenn.

Application June 16, 1948, Serial No. 33,257

1 Claim. (Cl. 286—5)

This invention relates to seals by which lubricant is prevented from transfer along a shaft from the shaft bearing. It has particular reference to improvements in constructions which employ grease seal assembly of the general type shown in Patent No. 2,251,760, in which patent a seal is shown for a rear wheel bearing by means of which lubricant is prevented from escaping from the axle bearings onto the wheel, and more particularly to means by which the useful life of the parts which turn relatively to the seal are prolonged without repair or replacement.

It further relates to means by which relief from excessive pressure of grease filled bearings is had.

In rear wheel bearings of motor vehicles, grease escaping from the bearings by which the axle is journalled in the rear axle housing onto the hub of the wheel which is mounted on the axle, is thrown outward along the hub flange to the brake drums and often additionally to the wheel tires setting up dangerous or damaging conditions. To prevent grease escape the wheel hub is substantially cylindrically turned and a seal preferably of the general type shown in the above noted patent is mounted in the axle housing, the seal making sliding contact with the rotating surface of the wheel hub and effectually preventing the escape of the grease. Eventually, however, the rotating surface of the hub becomes grooved and effectiveness of the seal is lost. This danger is often accentuated by overfilling of the space around the bearing in the axle housing or by leakage of oil into the bearing space from the differential, either of which, and particularly the oil, may escape to the wheel when the hub has become grooved. The grease, if cut back by oil, is harder to retain than otherwise, and drainage of the oil is advisable, provided such drainage is not so free as to permit the escape of the less fluid grease except under overfilling or other pressure.

A similar grooving action is set up by seals used in other places, as by the seal used in connection with the pinion gear shaft of an automobile, which shaft extends forward from the differential housing. The latter seal prevents escape of oil from the housing, but eventually grooves the hub of the universal joint flange, and as before due to this grooving escape of oil from the differential housing occurs.

To remove the groove in the shaft and restore sealing action requires remachining of the parts, and even building up the groove before remachining, or discarding them and replacing them with new parts, any one of which is expensive and is rendered unnecessary by the present invention.

The objects of the invention are:

To provide means for establishing from time to time a new position of the seal along the shaft, hub or other part which is turning relatively to the seal.

A further object is to provide means for preventing building up of excessive pressure in bearing mountings and to thereby relieve the seal from excessive pressure.

The means by which the foregoing and other objects are accomplished and the manner of their accomplishment will readily be understood from the following specification on reference to the accompanying drawings, in which:

Fig. 3 is a sectional elevation taken along the center line of the differential pinion gear shaft of a motor vehicle showing a fragmentary portion of the differential housing, the shaft bearing mounted therein, the seal through which escape of oil from the differential housing is prevented, and the inserted spacer by which shift of the seal has been accomplished.

Fig. 4 is a sectional elevation taken on the line IV—IV of Fig. 3 showing the spacer by which seal shift is accomplished, and the conformation of the spacer whereby circulation within the bearing is accomplished.

Figure 1:
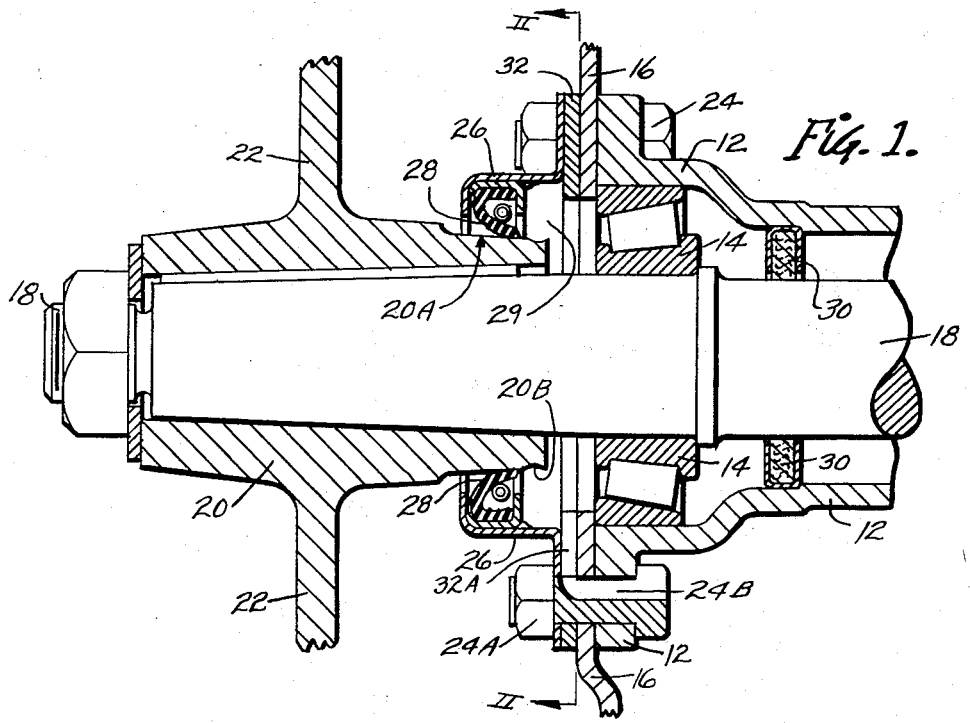
Fig. 1 is a sectional elevation of one of the rear axle bearings and bearing housings of a motor vehicle, showing the wheel axle journalled therein, and the wheel hub, together with a section of the seal by means of which transfer of grease from the axle bearing to the wheel hub is cut off, and an inserted spacer by which shift of the seal along the shaft has been accomplished.
Figure 2:
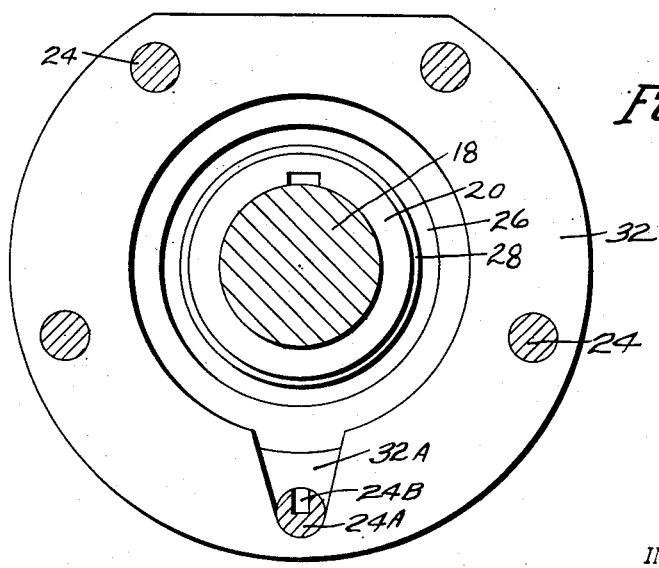
Fig. 2 is a sectional elevation taken on the line II—II of Fig. 1 showing the pressure relief feature of the spacer by which the seal shift is accomplished.

Referring now to the drawings in which the various parts are indicated by numerals: 12 is a typical motor vehicle rear axle housing which extends from the differential housing (not shown). The housing 12 mounts a bearing 14 which is retained in the housing by a brake backing plate 16 and journals an axle 18. The axle projects beyond the housing and has keyed thereon a wheel hub 20 having a disc flange 22.

Inwardly, the wheel hub extends into adjacency to the housing and has a smoothly turned substantially cylindrical portion 20A.

Secured to the housing 12 by bolts 24, is a flanged seal housing 26 which encloses and mounts a seal including an annular seal element or wiper 28, the wiper being positioned by its mounting to annularly embrace the turned portion 20A of the wheel hub, and cooperates with the seal housing and bearing housing to establish a grease chamber 29. An additional seal 30 within the axle housing cuts off oil flow from the differential to the bearing.

Initially the seal housing 26 is secured against the brake backing plate 16, and the wiper is thereby positioned to embrace the hub adjacent its inner end. Under continued use the wiper cuts an annular groove 20B in the hub and becomes ineffective, requiring either expensive work to eliminate the hub groove, or replacement of the wheel hub and flange. Additionally under concurrent use the seal 30 becomes less effective and allows increasing though usually less serious escape of oil from the differential into the bearing chamber.

My improvement comprises an annular spacer 32 which is inserted between the backing plate 16 and the seal housing 26, and so inserted positions the seal element or wiper 28 outward along the wheel hub on an unworn portion of the wheel hub and reestablishes the seal. Usually the seal wiper does not need replacement by a new one but if it is too much worn its replacement may be made at the same time. The spacer is provided with bolt holes conforming in size and spacing to the size and spacing of the bolts 24, and may be inserted and bolted in place by the original or by slightly longer bolts. In usual cases one of the bolts is directly beneath the axle. Preferably the spacer is cut out upwardly from the corresponding bolt hole to form a notch 32A open into the grease chamber 29. The corresponding bolt is replaced by a bolt 24A having a longitudinal groove 24B leading along the bolt to one or the other only of the bolt ends and completing with the spacer notch 32A a drainage channel from the seal housing. The channel is purposely of restricted size to resist flow of grease therethrough except under pressure, but freely permits drainage of the more fluid oil. The bolt 24A when put in is so placed that the groove 24B opens behind the brake bearing plate 16 from the wheel hub and prevents drainage reaching the wheel.

In Fig. 3, 42 is a portion or extension of the differential housing (not shown), housing and mounting a bearing 44 which journals a pinion gear shaft 46 extending from the differential. Secured on the shaft 46 is a flange member 48 which couples to the universal flange (not shown). The flange member has a cylindrical hub portion 48A which extends within the extension 42 of the differential housing. Also mounted in the extension 42 is a seal housing 50 which encloses and mounts parts including an annular seal element or wiper 52, the wiper 52 being positioned by its mounting within the extension 42, to annularly embrace the cylindrical hub portion 48A of the flange. Under use the wiper cuts an annular groove 48B in the hub and becomes ineffective, requiring as before expensive work to eliminate the hub groove or replacement of the flange member 48.

My improvement comprises an annular spacer 54 through which the seal housing 50 and wiper 52 carried thereby, is displaced longitudinally along the hub 48A and away from the groove 48B therein. Internally the spacer 54 is provided with notches 54A which insure return of oil stripped off from the hub by the wiper 52 into the oil space between the wiper and the bearing and within the extension 42.

It will be understood, therefore, that the invention primarily resides in the means by which an annular grease or oil retaining stripper of well known type, which encircles a relatively rotating cylindrical member to restrain escape of the grease or oil along the member and inherently eventually grooves the member, may be longitudinally shifted along the member to a groove free portion thereof, and secondarily to means forming part of the shifting means and means cooperating therewith by which drainage and disposition of oil from the grease chamber is effected.

It will further be understood that gaskets, though not here shown, may be interposed in the usual manner of constructions of this type, between the seal ring housing and spacer, and between the spacer and backing.

I claim:

In a seal between an annular housing member and a rotating, substantially cylindrical, hub member concentric therewith, which seal includes an annular seal housing, an annular flexible wiper carried by said seal housing, and bolts, including a hub underlying bolt, removably securing said seal housing against an end of said housing member and concentrically around said hub member, with said wiper in sealing contact around, and under use grooving said hub member; an annular spacer having apertures receiving said bolts, and disposed between said housing member end and said seal housing displacing said wiper along said hub member and positioning said wiper on an unworn portion of said member, said spacer interiorly being downwardly notched into the hole for said hub underlying bolt, and said hub underlying bolt being grooved longitudinally from said spacer to one end thereof.

REGINALD R. BEEZLEY.

References Cited in the file of this patent

UNITED STATES PATENTS

| Number | Name | Date |
|---|---|---|
| 1,092,256 | Glauber | Apr. 7, 1914 |
| 1,269,972 | Stafford | June 18, 1918 |
| 1,355,652 | Coppus et al. | Oct. 12, 1920 |
| 1,982,729 | Eberhard | Dec. 4, 1934 |
| 2,063,335 | Person | Dec. 8, 1936 |
| 2,094,752 | Rosenberry et al. | Oct. 5, 1937 |
| 2,239,283 | Brown | Apr. 22, 1941 |
| 2,251,760 | Schantz et al. | Aug. 5, 1941 |
| 2,267,994 | Reynolds et al. | Dec. 30, 1941 |
| 2,506,179 | Taplin | May 2, 1950 |

FOREIGN PATENTS

| Number | Country | Date |
|---|---|---|
| 51,229 | The Netherlands | of 1941 |